UNITED STATES PATENT OFFICE.

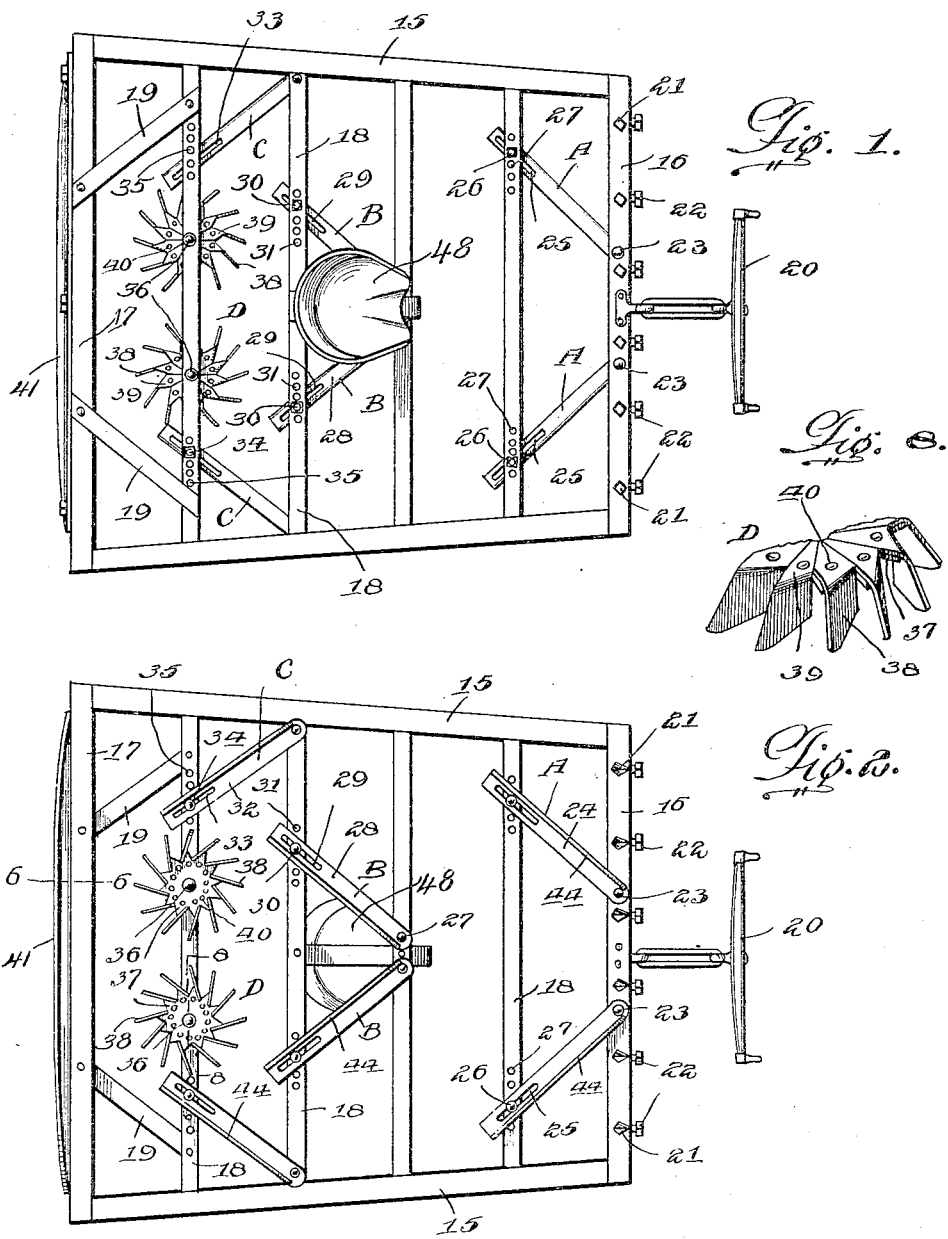

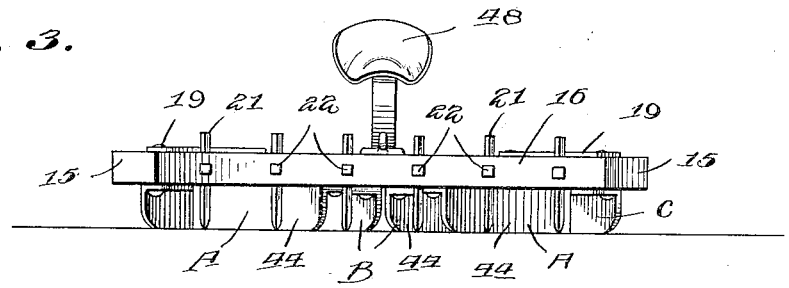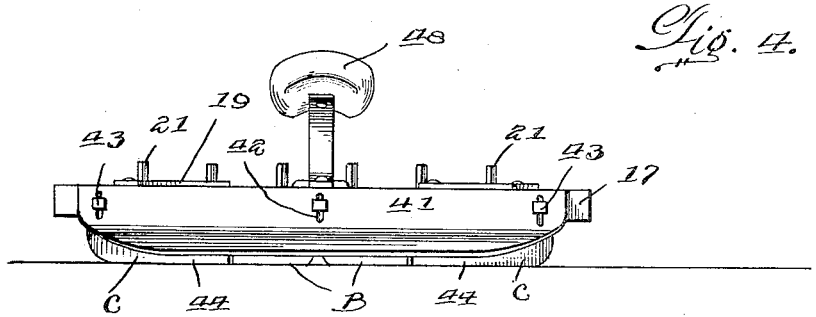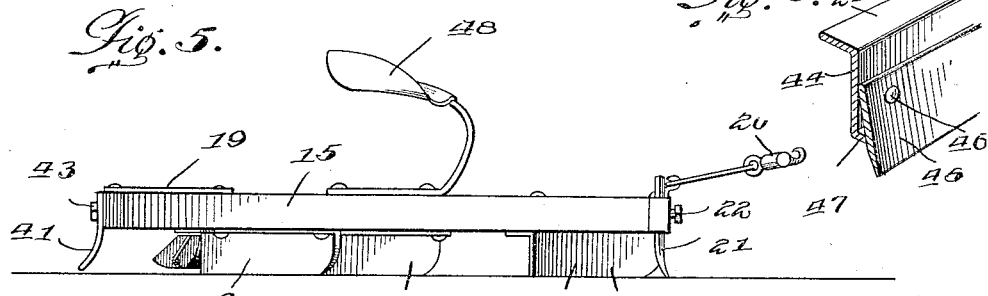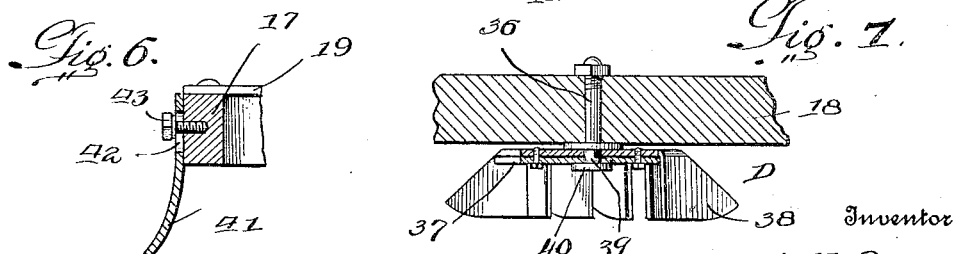

JOSEPH H. PORTER, OF WORTON, MARYLAND.

HARROW AND LAND-LEVELER.

1,112,474.  Specification of Letters Patent.  Patented Oct. 6, 1914.

Application filed April 3, 1914. Serial No. 829,339.

*To all whom it may concern:*

Be it known that I, JOSEPH H. PORTER, a citizen of the United States, residing at Worton, in the county of Kent and State of Maryland, have invented new and useful Improvements in Harrows and Land-Levelers, of which the following is a specification.

This invention relates to harrows and land levelers, and it has for its object to produce a simple and effective machine of this class.

A further object of the invention is to produce a machine of the class described embodying a carrying frame equipped with scarifiers to cut and loosen the surface of the soil; with scrapers or graders arranged at various angles to move the surface of the soil laterally away from and back to its initial position, thereby incidentally breaking the clods and turning the soil over to expose the same to the action of the air; with rotary elements or agitators whereby the soil will be thoroughly pulverized and aerated; and with a smoothing blade whereby the loose and pulverized soil will be smoothed and compacted to the desired degree.

A further object of the invention is to improve the construction of the rotary agitators by providing the same with detachable earth engaging blades whereby, in the event of the breakage of any of said blades, it may be quickly detached and another one substituted at slight expense.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—Figure 1 is a top plan view of a machine constructed in accordance with the invention. Fig. 2 is a bottom plan view of the same. Fig. 3 is a front elevation. Fig. 4 is a rear elevation. Fig. 5 is a side elevation. Fig. 6 is a sectional detail view taken on the line 6—6 in Fig. 2. Fig. 7 is a sectional detail view taken on the line 8—8 in Fig. 2. Fig. 8 is a perspective detail view showing a portion of one of the rotary agitators. Fig. 9 is a perspective detail view of one of the scraper elements showing the cutting blade connected therewith.

Corresponding parts in the several figures are denoted by like characters of reference.

The frame of the improved implement is composed of side bars 15 which preferably are arranged to converge slightly in a forward direction, said side bars being connected together by front and rear bars 16, 17 and spaced apart intermediate their front and rear ends by cross bars 18, the rearmost one of which is also connected with the rear bar 17 by means of inclined braces 19. A swingletree or evener 20 is connected with the front cross bar 16 for attachment of the draft.

The front cross bar 16 is vertically apertured for the passage of the shanks of a plurality of teeth or scarifiers 21 which are secured for vertical adjustment by means of set screws 22. Pivoted on the underside of the front cross bar by means of pivot members, such as bolts 23, are scraper members each consisting of an angle bar A, the horizontal flange of which extends beneath the forward cross bar 18 and is provided with a slot 25 for the passage of a bolt 26 for the accommodation of which the forward cross bar 18 is provided with a plurality of apertures 27 so that by changing the said bolt from one to another of said apertures, the angle of the scraper member with respect to the front bar 16 may be varied. The pivotal bolts of the scraper members A are somewhat spaced apart so that said scraper bars will operate on the soil in proximity to the side bars of the frame. A second pair of scraper bars consisting of angle bars B are pivotally mounted by means of bolts 27 on the underside of one of the cross bars 18, said scraper bars B being mounted closely together so as to operate more particularly on the soil beneath the longitudinal medial portion of the frame. The scraper bars B have horizontal flanges 28 with slots 29 for the passage of bolts 30, the latter being adjustable in apertures 31 in the cross bar 18 in rear of the one with which the scrapers B are pivotally connected. The angle of these scraper bars, which are rearwardly divergent, may thus be varied. A third set of scraper bars C are pivoted on one of the cross bars 18, said scraper bars consisting of angle bars having horizontal flanges 32 provided with slots 33 for the passage of bolts 34 that extend through apertures 35 in the rearward cross bar 18 beneath which the flanges 32 extend. A plurality of apertures is provided for the bolts 34 in order to enable the angles of the scraper bars C to be varied, it being observed that said scraper bars are pivoted adjacent to the side members 15 of the frame and that they are convergent rearwardly so as to move the loose soil in an inward direction.

Mounted for rotation by means of supporting members or bolts 36 on the under face of the rearward cross bar 18 intermediate the rearwardly convergent rear ends of the scraper members C are agitators D, each consisting of a disk 37 on which a plurality of blades 38 are detachably secured by means of bolts or fastening members 39, each of the blades 38 being provided with a flange 40 which is provided for the passage of the fastening member 39. The blades are disposed tangentially with respect to an imaginary circle of smaller radius, but concentric with the disk 37. Owing to this arrangement of the blades when the implement is drawn or dragged over the ground, the disks will rotate and the blades will serve to thoroughly cut, pulverize and agitate the soil which will thus be thoroughly aerated and placed in a fit condition for the reception of seed.

Adjustably mounted on the rear cross bar 17 of the frame is a smoothing or leveling blade 41 which is beveled or inclined in a rearward direction and provided with vertical slots 42 for the passage of fastening members, such as screws 43, which enable the said leveling blade to be adjusted vertically so that the loose and pulverized soil which has been operated upon by the instrumentalities associated with the forward part of the frame may be thereby packed or compacted to the desired degree.

The scraper elements A, B and C being each composed of an angle bar, it follows that each has a substantially vertical flange 44. These flanges may directly engage the soil when desired, but it is usually preferred to provide each of said flanges with a tilted or inclined cutting blade 45 secured thereon by bolts or fastening members 46 and engaging the surface of the soil at other than a right angle so as to exercise a cutting and shearing action which materially facilitates the operation of the device by cutting and loosening the surface of the soil. For the purpose of supporting the cutting blade 45 in a tilted or inclined position, the vertical flange 44 of the scraper element may be provided with a bead or flange 47 at the lower edge thereof, as clearly indicated in Fig. 9.

A seat 48 for the driver or operator is mounted in any convenient position on the frame.

From the foregoing description, taken in connection with the drawings hereto annexed, the operation and advantages of this invention will be readily understood by those skilled in the art to which it appertains. By drawing or dragging the implement over the ground, the surface of the soil will be scarified, and the top crust will then be moved laterally first in a forward direction and afterward toward a medial longitudinal line of the implement, the surface soil being thus thoroughly agitated and broken. The rearwardly convergent scraper members that move the dirt in an inward direction will place it substantially in the path of the rotary agitators which will serve to still further pulverize the soil, the particles being thoroughly exposed to the revivifying action of the air. The surface of the dirt is finally compacted by the action of the leveling member 41, thus leaving the soil in excellent condition for the reception of seed.

Having thus described the invention, what is claimed as new, is:—

1. A frame including side bars, front and rear bars and intermediate cross bars, angular scraper elements mounted on the underside of said frame in pairs, some of said scraper bars diverging rearwardly and others converging rearwardly, and means for adjustably supporting the said scraper bars to enable the angles therebetween to be varied.

2. In an implement of the class described, a carrying frame, pairs of rearwardly divergent angular scraper bars mounted on the underside of the frame, a pair of rearwardly convergent scraper bars mounted on the underside of the frame in rear of the first mentioned scraper bars, and agitating elements supported for rotation intermediate the rearwardly convergent scraper bars.

3. In an implement of the class described, a carrying frame having a front cross bar, scarifiers connected with said front cross bar for vertical adjustment, rearwardly divergent scraper elements supported on the underside of the frame in rear of the scarifiers, rearwardly convergent scraper elements supported on the underside of the frame in rear of the first mentioned scraper elements, and agitator elements supported for rotation intermediate the rearwardly convergent scraper elements.

4. In an implement of the class described, the combination with a carrying frame having scraper elements for moving the soil laterally, said scraper elements converging in a rearward direction, of agitator elements supported for rotation intermediate said scraper bars, each of said agitator elements comprising a disk and a plurality of tangentially disposed cutting members detachably connected therewith.

5. In an implement of the class described, a carrying frame having a front bar, scarifiers adjustably connected with said front bar, scraper elements supported on the underside of the frame, said scraper elements consisting of angle bars arranged in pairs, some diverging rearwardly and others converging rearwardly to move the soil engaged thereby in opposite directions, rotary agitator elements supported intermediate the rearwardly convergent scraper elements, and a leveling bar adjustably connected with the carrying frame at the rear end thereof.

In testimony whereof I affix my signature in presence of two witnesses.

JOSEPH H. PORTER.

Witnesses:
WM. BAGGER,
BENNETT S. JONES.

---

Copies of this patent may be obtained for five cents each, by addressing the "Commissioner of Patents, Washington, D. C."